United States Patent [19]
Yamashita

[11] Patent Number: 5,655,333
[45] Date of Patent: Aug. 12, 1997

[54] GLASS RUN

[75] Inventor: Takashi Yamashita, Hiroshima, Japan

[73] Assignee: Nishikawa Rubber Co., Ltd., Hiroshima, Japan

[21] Appl. No.: 680,695

[22] Filed: Jul. 18, 1996

[30] Foreign Application Priority Data

Jul. 25, 1995 [JP] Japan .................. 7-189258

[51] Int. Cl.$^6$ .................. E05D 15/16; E06B 7/16
[52] U.S. Cl. .................. 49/441; 49/479.1
[58] Field of Search .................. 49/440, 441, 479.1

[56] References Cited

U.S. PATENT DOCUMENTS

| | | | |
|---|---|---|---|
| 4,969,295 | 11/1990 | Nishikawa et al. | 49/441 X |
| 4,977,706 | 12/1990 | Kisanuki | 49/441 X |
| 5,150,542 | 9/1992 | Hannya et al. | 49/441 |
| 5,195,274 | 3/1993 | Mishima et al. | 49/441 |

FOREIGN PATENT DOCUMENTS 63-78812  4/1988  Japan .................. 49/441

*Primary Examiner*—Kenneth J. Dorner
*Assistant Examiner*—Curtis Cohen
*Attorney, Agent, or Firm*—Sughrue, Mion, Zinn, Macpeak & Seas

[57] ABSTRACT

A glass run comprises: a vertical run including a vehicle outside seal lip, a curved seal lip, and a coupling portion through which the vehicle outside seal lip and the curve seal lip are coupled to each other; and an inclined run including the vehicle outside seal lip, the curved seal lip, a hollow lip having a hollow, and a coupling portion through which the vehicle outside seal lip, the curve seal lip and the hollow lip are coupled to one another. The vertical run and the inclined run are formed as one unit by molding in such a manner that the vertical run and the inclined run are joined obliquely. The coupling portion of the vertical run has a shift preventing protrusion on the rear surface thereof, and the door sash has an opening which is engageable with the protrusion, so that the inclined run is prevented from being shifted.

3 Claims, 2 Drawing Sheets

GLASS RUN

BACKGROUND OF THE INVENTION

This invention relates to a glass run arranged along a door frame in an automobile, and more particularly to the structure of a glass run provided near a door mirror.

As shown in FIGS. 3 through 6, a window glass pane 2 fixed in a door 1 of an automobile is held gas-tight and water-tight by a glass run 3 of rubber or resin which is arranged along the frame 4 of the door 1 (hereinafter referred to as "a door frame 4", when applicable), in such a manner that it is vertically movable in the directions of the arrow E, and is prevented from vibrating and causing noise. A glass run 3 (in the encircled section D), located between the window pane 2 and a door mirror 5, is made up of a vertical run 6 and an inclined run 10 which are joined obliquely.

The vertical run 6 comprises: a vehicle outside seal lip 7; a curved seal lip 8 which is curved under the seal lip 7; and a coupling portion 9 through which seal lips 7 and 8 are coupled to each other in such a manner that a small gap G is formed therebetween for receiving a part of the window pane 2.

The inclined run 10 comprises: the vehicle outside seal lip 7; the curved seal lip 8; a hollow seal 11 having a hollow 11a; and another coupling portion 12 through which the seal lips 7 and 8 and the hollow seal 11 are coupled to one another. In fixing the window pane 2 in the frame, the upper edge portion of the glass plate 2 is inserted into the gap G while abutting against the hollow seal 11, so that the window pane 2 is effectively sealed thereby.

However, the above-described conventional glass run suffer from the following difficulties: When the window pane 3 is repeatedly moved up and down (in the directions of the arrow E), the friction of the window pane 2 against the seal lips 7 and 8 is liable to cause the glass run 3 to shift along the inclined door frame 4 in the direction of the arrow F in FIG. 3. As a result, as shown in FIG. 6, which is a sectional view taken along line B—B in FIG. 4, a gap H is formed between the vehicle outside seal lip 7 and the window pane 2 near the intersection of the vertical run 6 and the inclined run 10. The gap H is a factor which may produce a howling sound.

In order to overcome this difficulty, a method has been proposed. In the method, as shown in FIG. 5, which is a sectional view taken along line A—A in FIG. 4, a plurality of clip members 13 embedded in the coupling portion 12 of the inclined run 10 are inserted into a door sash to prevent the glass run 3 from shifting. However, the method is disadvantageous in that the installation cost is increased.

Another method has been proposed in which a tensile force is applied in the direction opposite to the direction of the arrow F. In addition, a method has been proposed in which the lips of the molding are manually modified (pulled). However, the method is not effective in preventing the shift of the glass run because the lips become contracted after being set.

SUMMARY OF THE INVENTION

In view of the foregoing, an object of the invention is to eliminate the difficulties accompanying a conventional glass run. More specifically, an object of the invention is to provide a glass run which is compact in structure and is effectively prevented from being shifted as a result of the frictional resistance of the window pane.

The foregoing object of the invention has been achieved by the provision of a glass run which comprises:

a vertical run including
  a vehicle outside seal lip,
  a curved seal lip which is curved inside the vehicle outside seal lip, and
  a coupling portion through which the vehicle outside seal lip and the curve seal lip are coupled to each other in such a manner that a small gap is formed therebetween such that a portion of the window pane is received in the gap, thus guiding the vertical motion of the window pane, an inclined run including
  the vehicle outside seal lip,
  the curved seal lip,
  a hollow lip having a hollow, and
  a coupling portion through which the vehicle outside seal lip, the curve seal lip, and the hollow lip are coupled to one another,
    with the upper edge portion of the glass plate inserted into the gap while being abutted against the hollow seal, so that the window pane is effectively sealed thereby, the vertical run and the inclined run being formed as one unit by molding in such a manner that the vertical run and the inclined run are joined obliquely, the glass run being arranged along a door sash to which the window pane which is vertically movable and a door mirror are adjacent, in which, according to the invention,
  the coupling portion of the vertical run has a shift preventing protrusion on the rear surface thereof, and
  the door sash has an opening which is engageable with the protrusion.

DETAILED DESCRIPTION OF THE PREFERRED EMBODIMENTS

Figure 1:
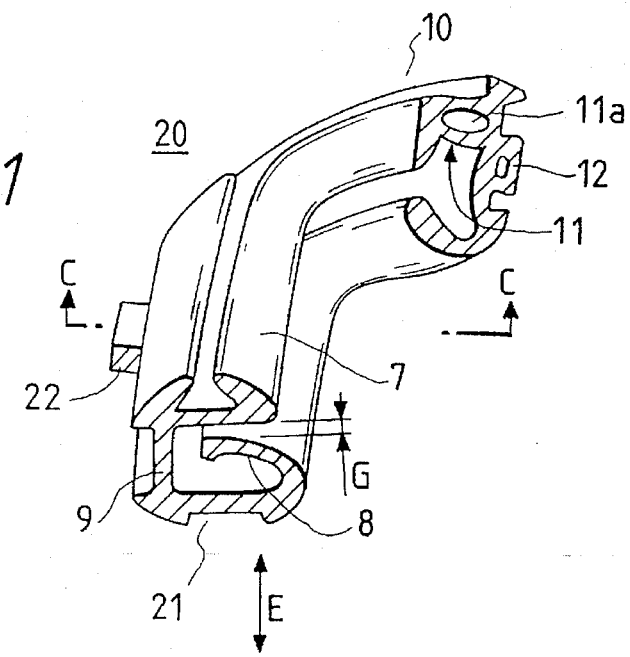
FIG. 1 is a perspective view of a glass run according to the invention.

A glass run, which constitutes an embodiment of the invention, will be described with reference to FIGS. 1 and 2, in which parts and structures corresponding functionally to those already described with reference to the conventional glass run shown in FIGS. 3 through 6 are therefore designated by the same reference numerals or characters.

The glass run 20 of the invention, like the above-described conventional glass run 3, is made of rubber or resin, comprising a vertical run 21 and an incline run 10 which are joined obliquely.

Figure 2:
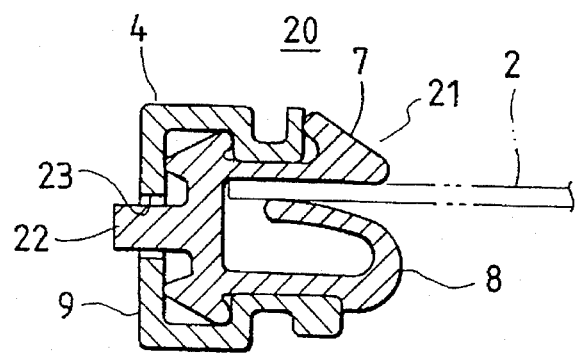
FIG. 2 is a sectional view taken along line C—C in FIG. 1.
Figure 3:
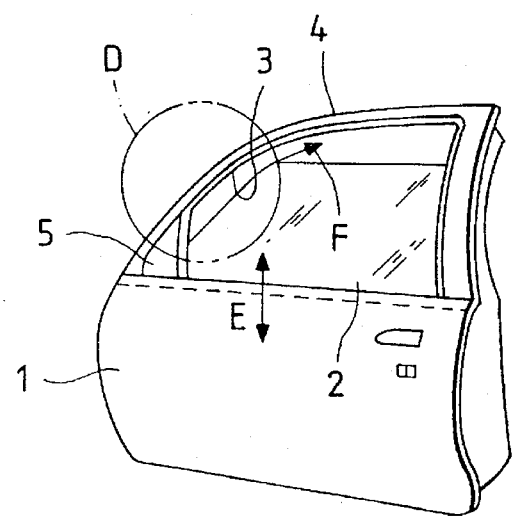
FIG. 3 is a perspective view of a vehicle's door with a glass run.
Figure 4:
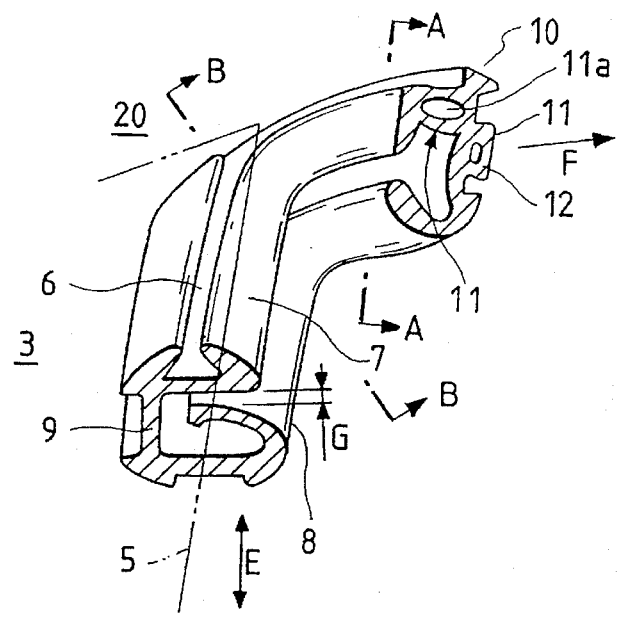
FIG. 4 is a perspective view of a conventional glass run.
Figure 5:
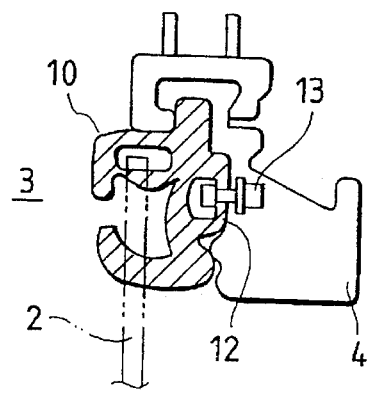
FIG. 5 a sectional view taken along line A—A in FIG. 4.
Figure 6:
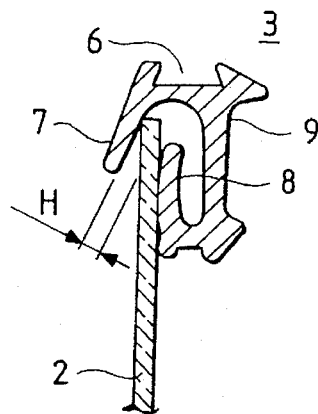
FIG. 6 is a sectional view taken along line B—B in FIG. 4.

The vertical run 21, as shown in FIG. 2 which is a sectional view taken along line C—C in FIG. 1, comprises: a vehicle outside seal lip 7, a curved seal lip which is curved under the seal lip 7; and a coupling portion 9 through which those seal lips 7 and 8 are coupled to each other in such a manner that a small gap G is formed between those seal lips 7 and 8 into which a part of a window pane 2 is inserted.

A shift preventing protrusion 22 is formed on the back surface of the coupling portion 9, while in correspondence to the protrusion 22, an opening 23 is formed in a door sash 4; more specifically, the opening 23 is formed in the door sash 4 which is confronted with the protrusion 22 so that the protrusion 22 is engaged with the opening 23.

The inclined run 10 comprises: the vehicle outside seal lip 7; the curved seal lip 8; a hollow seal 11 having a hollow 11a; and a coupling portion 12 through which the seal lips 7 and 8 are coupled to each other. In fixing the window pane 2 in the frame, the upper edge portion of the window pane 2 is inserted into the gap G while abutting against the hollow seal 11, so that the window pane 2 is effectively sealed thereby.

In the glass run 20 thus constructed, the protrusion 22 is formed on the rear surface of the coupling portion of the vertical run 21, while the opening 23 is formed in the door sash 4 in correspondence to the protrusion 22, so as to engage with the latter. This feature readily and effectively prevents the inclined run 10 from shifting in the direction of the arrow F when window pane 2 is moved up and down in the directions of the arrow E. In other words, the inclined run 10, unlike the conventional one, is free from the difficulty that when the window pane 2 is moved up and down, in the directions of the arrow E, it is shifted in the directions of the arrow F.

Furthermore, the glass run of the invention is advantageous over the conventional one in that it is unnecessary to have the clips 13 or to manually modify (elongate or pull) the lips of the run. In addition, with the glass run of the invention, the installation cost is decreased, and the glass plate is maintained stably sealed.

What is claimed is:

1. A glass run comprising: a vertical run including
    a first outside seal lip,
    a first curved seal lip which is curved inside said first outside seal lip, and
    a coupling portion through which said first outside seal lip and said first curve seal lip are coupled to each other in such a manner a first gap is formed between said seal lips a portion of a window pane being received in said first gap so that said window pane is vertically guided;
an inclined run including
    a second outside seal lip which is continuous with said first outside seal lip,
    a second curved seal lip which is continuous with said first curved seal lip,
    a hollow lip having a hollow, and
    a coupling portion through which said second outside seal lip, said second curve seal lip and said hollow lip are coupled to one another such that said second seal lips define a second gap which is continuous with said first gap,
        with an upper edge portion of said window pane being received in said second gap while being abutted against the hollow seal, so that said window pane is effectively sealed thereby,
    said vertical run and said inclined run being formed as a single unit by molding in such a manner that said vertical run and said inclined run are joined obliquely,
    said glass run being arranged along a door sash, wherein said coupling portion of said vertical run has a shift preventing protrusion on rear surface thereof, and said door sash has an opening which is engageable with said protrusion.

2. The glass run of claim 1 wherein said vertical and inclined runs are made of rubber.

3. The glass run of claim 1 wherein said vertical and inclined runs are made of resin.

* * * * *